United States Patent
Caffee (10) Patent No.: US 9,634,861 B2
(45) Date of Patent: Apr. 25, 2017

(54) CALIBRATION OF TRANSCEIVER

(71) Applicant: Silicon Laboratories Inc., Austin, TX (US)

(72) Inventor: Aaron J. Caffee, Scappoose, OR (US)

(73) Assignee: Silicon Laboratories Inc., Austin, TX (US)

( * ) Notice: Subject to any disclaimer, the term of this patent is extended or adjusted under 35 U.S.C. 154(b) by 84 days.

(21) Appl. No.: 14/798,545

(22) Filed: Jul. 14, 2015

(65) Prior Publication Data

US 2017/0019269 A1    Jan. 19, 2017

(51) Int. Cl.
  *H04L 12/423*    (2006.01)
(52) U.S. Cl.
  CPC .................. *H04L 12/423* (2013.01)
(58) Field of Classification Search
  CPC .................................................. H04L 12/423
  See application file for complete search history.

(56) References Cited

U.S. PATENT DOCUMENTS

| | | | |
|---|---|---|---|
| 7,061,925 B2 | 6/2006 | Joshi | |
| 7,286,624 B2 | 10/2007 | Woo et al. | |
| 8,726,107 B2 * | 5/2014 | Tetzlaff | G11C 29/022 714/719 |
| 2006/0223558 A1 * | 10/2006 | Behzad | H04B 1/0082 455/502 |

OTHER PUBLICATIONS

Baba, A., "Calibrating Time of Flight in Two Way Ranging," 2011 Seventh International Conference on Mobile Ad-hoc and Sensor Networks, IEEE 2011, pp. 393-397.
Barrau, F., et al., "Distance Measurement using Narrowband ZigBee devices," IEEE 23rd Wireless and Optical Communication Conference (WOCC), May 2014, 6 pages.
Farahani, S., "ZigBee Wireless Networks and Transceivers," Elsevier Ltd., 2008, Chapter 7, pp. 225-247.
Gu, J. William, "The optical fiber latency measurement," Data Acquisition Group, Feb. 1, 2011, 7 pages.
Lanzisera, S., et al., "Radio Frequency Time-of-Flight Distance Measurement for Low-Cost Wireless Sensor Localization," IEEE Sensors Journal, vol. 11, No. 3, Mar. 2011, pp. 837-845.

(Continued)

*Primary Examiner* — Duc C Ho
(74) *Attorney, Agent, or Firm* — Zagorin Cave LLP (57) ABSTRACT

Techniques for reducing error in time-of-flight measurement due to transceiver latency are disclosed. A method includes determining a first indicator of a first latency of a first transceiver of a first system using a first loopback configuration of the first transceiver. The method includes receiving a second indicator of a second latency of a second transceiver determined by a second system using a second loopback configuration of the second transceiver. The method includes determining a third indicator of a roundtrip latency of a communication from the first transceiver to the second transceiver and back to the first transceiver. The method includes determining a time-of-flight between the first system and the second system based on the first indicator, the second indicator, and the third indicator.

20 Claims, 6 Drawing Sheets

(56) References Cited

OTHER PUBLICATIONS

Lanzisera, S., et al., "RF Time of Flight Ranging for Wireless Sensor Network Localization," Fourth Workshop on Intelligent Solutions in Embedded Systems, Austria, Jun. 30, 2006, 12 pages.

Li, J. and Robertson, M., "TLK10002 Latency Measurement in Wireless Base Station System," Texas Instruments, Application Report SLLA326—Apr. 2012, pp. 1-7.

Pichler, M., et al., "Multi-Channel Distance Measurement with IEEE 802.15.4 (ZigBee) Devices," IEEE Journal of Selected Topics in Signal Processing, vol. 3, No. 5, Oct. 2009, pp. 845-859.

Qlogic, "Enhanced Reliability and Diagnostics for 2600 Series," Technology Brief, SN0430999-00 Rev. B, Dec. 2014, pp. 1-3.

Santinelli, G., et al., "Self-Calibrating Indoor Positioning System Based on ZigBee® Devices," International Instrumentation and Measurement Technology Conference Singapore, May 2009, 6 pages.

Sark, V. and Grass, E., "A Software Defined Radio for Time of Flight Based Ranging and Localization," downloaded from research.microsoft.com/en-US/.../2014_ipsn_sark.pdf, Apr. 2015, 1 page.

Szabo, A., et al., "Unsupervised Learning of Propagation Time for Indoor Localization," IEEE 73rd Vehicular Technology Conference (VTC Spring), 2011, 5 pages.

Texas Instruments, "TDC1000 Ultrasonic Sensing Analog Front End (AFE) for Level Sensing, Flow Sensing, Concentration Sensing, and Proximity Sensing Applications," SNAS648A—Oct. 2014, Revised Dec. 2014, pp. 1-47.

Texas Instruments, "AN-1507 DP83848 and DP83849 100 Mb Data Latency," Application Report SNLA084B—Aug. 2006, Revised Apr. 2013, pp. 1-16.

Thorbjornsen, B., et al., "Radio Frequency (RF) Time-of-Flight Ranging for Wireless Sensor Networks," IEEE Sensors Journal, vol. 11, No. 3, Mar. 2011, 22 pages.

\* cited by examiner

CALIBRATION OF TRANSCEIVER

BACKGROUND

Field of the Invention

The disclosure relates to communications systems in general, and to techniques for determining time-of-flight between nodes of a communications system, in particular.

Description of the Related Art

In general, two-way ranging includes cooperative techniques for determining a time-of-arrival or time-of-flight of a signal between two nodes. The time-of-flight information may be used to determine a distance between nodes, position, velocity, acceleration, etc. However, sources of error in conventional time-of-flight measurement techniques limit the accuracy of any subsequent calculations based thereon. Time-of-flight refers to the latency of a transmission from a near-end transceiver to a far-end transceiver. Typical time-of-flight estimates are based on transmissions of digital signals, e.g., based on digital signals prior to conversion into analog signals for transmission and digital signals received after being converted from received analog signals. Those typical time-of-flight estimates do not include an accounting for delay of analog circuits (e.g., analog transmitter, analog receiver). However, the latencies of the analog circuits can be non-trivial. Another conventional time-of-flight measurement technique assumes that analog transmitter and analog receiver latency is below a predetermined value, $t_{transceiver}$, which may be predicted from transmitter and receiver designs and target manufacturing process information. Variation of actual transceiver latency from the predetermined value (e.g., due to manufacturing variances, environmental conditions, aging, or signal strength) introduces error in a time-of-arrival measurement or other metric determined based on the latency information. In an exemplary localization application, the transceiver latency error, $|t_{transceiver} - t_{transceiver\_actual}| = \Delta t_{transceiver}$, corresponds to a ranging error of at least approximately $c_{atmosphere} \times \Delta t_{transceiver}$, where $c_{atmosphere}$ is the rate of propagation of electromagnetic waves through air under typical atmospheric conditions. The transceiver latency error may introduce a substantial amount of error to a localization measurement in some applications. Accordingly, improved techniques for improving accuracy of time-of-flight measurements are desired.

SUMMARY OF EMBODIMENTS OF THE INVENTION

Techniques for reducing error in a time-of-flight measurement due to transceiver latency are disclosed. In at least one embodiment of the invention, a method includes determining a first indicator of a first latency of a first transceiver of a first system using a first loopback configuration of the first transceiver. The method includes receiving a second indicator of a second latency of a second transceiver determined by a second system using a second loopback configuration of the second transceiver. The method includes determining a third indicator of a roundtrip latency of a communication from the first transceiver to the second transceiver and back to the first transceiver. The method includes determining a time-of-flight between the first system and the second system based on the first indicator, the second indicator, and the third indicator. The method may include determining a distance between the first system and the second system based on the time-of-flight and a property of a physical transmission medium between the first system and the second system. The method may include sensing an indication of a sensed variable affecting the property, the distance being determined further based on the sensed variable.

In at least one embodiment of the invention, an apparatus includes a first system comprising a transceiver. The transceiver includes a transmitter and a receiver. An output of the transmitter is selectively coupled to an input of the receiver in a first configuration of the first system. The apparatus includes a time-to-digital converter module configured to generate a first indicator of a first latency in the first configuration of the first system. The apparatus includes a digital module configured to determine a time-of-flight between the first system and a second system based on the first indicator, a second indicator of a second latency of a second transceiver of a second system, and a third indicator of a roundtrip latency. The transceiver may be configured to receive the second indicator from the second system. The transceiver may be configured to transmit the first indicator to the second system. The time-to-digital converter module may be configured to generate the third indicator of the roundtrip latency in a second configuration of the first system. The digital module may determine a distance between the first system and the second system based on the time-of-flight and a property of a physical transmission medium between the first system and the second system. The apparatus may include a sensor configured to provide an indication of a sensed variable affecting the property. The distance may be determined further based on the sensed variable. The apparatus may include a switch circuit configured to selectively couple the output of the transmitter to the input of the receiver in the first configuration of the first system. The apparatus may include a switch circuit configured to selectively couple the output of the receiver to the input of the transmitter in a second configuration of the first system. The apparatus may include an analog-to-digital converter coupled between an output of the receiver and the digital module. The apparatus may include a digital-to-analog converter coupled between an input of the transmitter and the digital module. The apparatus may include a zero-delay attenuator configured to receive a signal from the transmitter and provide an attenuated version of the signal to the receiver in the first configuration and configured to be disabled in a second configuration.

In at least one embodiment of the invention, a method includes configuring a first transceiver of a first system in a first loopback configuration. The method includes determining a first indicator of a first latency of the first transceiver using the first loopback configuration. Determining the first indicator includes triggering a start of a time-to-digital conversion in response to a first signal edge on a first node between a transmit path digital-to-analog signal converter of the first system and an input to a transmitter of the first transceiver. Determining the first indicator includes triggering a stop of the time-to-digital conversion in response to a second signal edge on a second node between a receiver path analog-to-digital signal converter of the first system and an output of a receiver of the first transceiver. The method may include transmitting the first indicator from the first system to a second system.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

Figure 1:
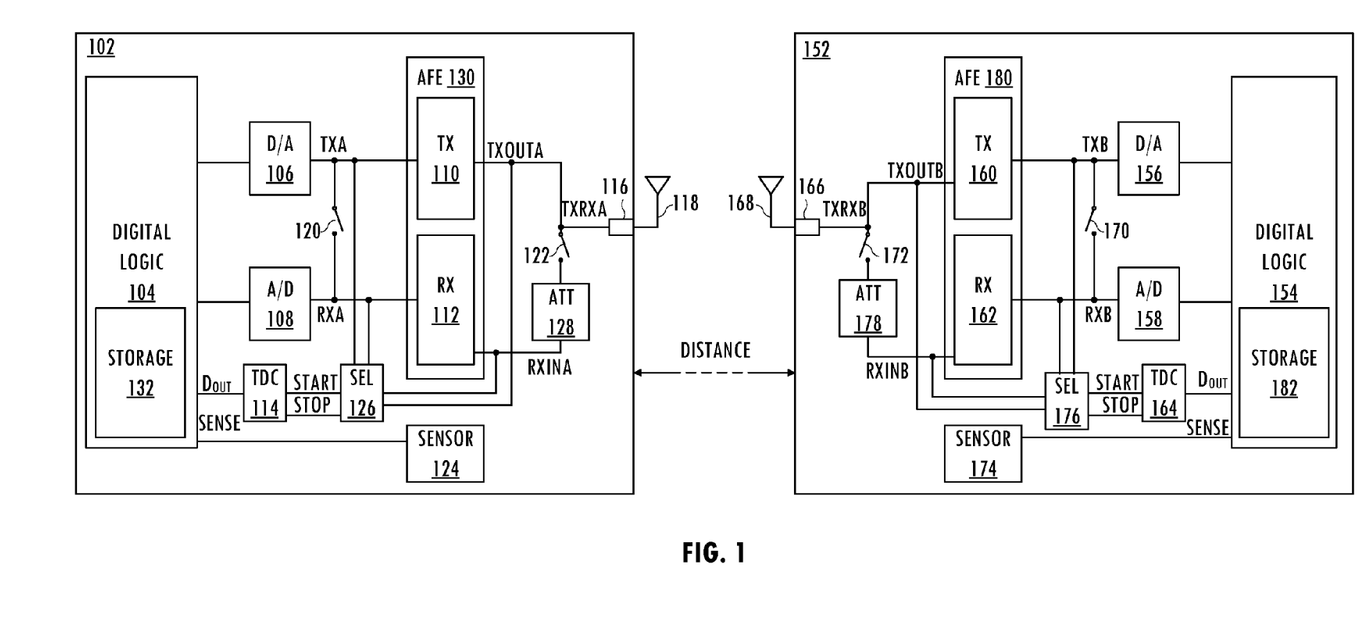
FIG. 1 illustrates a functional block diagram of a sensor system consistent with at least one embodiment of the invention.

A technique for improving accuracy of a time-of-flight measurement for use in sensor applications includes determining analog transceiver latency measurements using time-to-digital conversion techniques and operation of nodes in various loopback configurations. As referred to herein, time-of-flight is the time for an electromagnetic signal to travel from an output of the transmitter to the input of a receiver over a physical transmission medium. The physical transmission medium may include a wireline transmission medium (e.g., wire, cable, coaxial cable, twisted-pair wire, fiber optic cable, etc.) or a wireless transmission medium (e.g., air) and associated interface elements that interface the transmitter to the transmission medium (e.g., antenna, driver, balun, etc.). Referring to FIG. 1, in an exemplary application (e.g., a wireless sensor application), node 102 is positioned apart from node 152 by an unknown distance. One or both of nodes 102 and 152 may be a portable device, thus, the distance between the two nodes may vary over time. Although nodes 102 and 152 may include different hardware configured for different functions (e.g., remote sensor functions and base station sensor functions), nodes 102 and 152 include at least some similar or identical elements. For example, nodes 102 and 152 each include a transceiver analog front end, each of which includes an analog transmitter and an analog receiver. Note that transceiver analog front end 130 and associated components (e.g., analog transmitter 110 and analog receiver 112) may satisfy different requirements of a communications protocol, may have different latencies, and may experience different sources of variation than transceiver analog front end 180 and associated components (e.g., analog transmitter 160 and analog receiver 162).

In an exemplary embodiment of a system, nodes 102 and 152 each include a single port, port 116 and port 166, respectively, and a single antenna, antenna 118 and antenna 168, respectively, for duplex communications using a suitable communications protocol, although in other embodiments one or more of node 102 and node 152 includes an additional port and corresponding antenna (not shown) for simplex transmit and receive communications paths. Nodes 102 and 152 include time-to-digital converter 114 and time-to-digital converter 164, respectively, which are used to determine indicators of latencies of communications using one or more of the transceiver analog front ends. Time-to-digital converter 114 and time-to-digital converter 164 may be any suitable time-to-digital converter design responsive to one or more time interval signals defined by a start indicator and a stop indicator of the time interval and are configured to generate digital value $D_{OUT}$ corresponding to the relative time elapsed during that time interval. In at least one embodiment, time-to-digital converter 114 and time-to-digital converter 164 each include a digital counter responsive to a high-frequency reference clock signal having a predetermined period of oscillation.

Digital logic 104 and digital logic 154 may determine an absolute time interval based on a relative time interval indicated by the corresponding digital value $D_{OUT}$ of TDC 114 and TDC 164, respectively, and the period of a corresponding respective high-frequency reference clock signal. In a normal operating mode, digital logic 104 configures attenuator 128 to pass a signal on terminal 116 to node RXINA with negligible delay and attenuation. Similarly, in normal operation, digital logic 154 configures attenuator 178 to pass a signal on terminal 166 to node RXINB with negligible delay and attenuation. In a transceiver calibration mode, digital logic 104 and digital logic 154 configure attenuators 128 and 178, respectively, to attenuate a signal driven on TXOUTA or TXOUTB, respectively, with negligible delay to adjust the amplitude of the corresponding loopback signal within a dynamic range specification for processing by analog receiver 112 and analog receiver 162, respectively. Sensor 124 and sensor 174 may be included to provide digital logic 104 and digital logic 154, respectively, sensed data indicative of relative changes in the permittivity of the transmission medium for changes to environmental factors, e.g., temperature, humidity, barometric pressure, etc. In addition, received signal strength and time (i.e., aging) are additional variables that may affect, and may be used to calibrate a transceiver latency measurement for use in a time-of-flight measurement.

Digital logic 104 and digital logic 154 may each be implemented as a single special purpose integrated circuit (e.g., ASIC) having a main or central processor unit for overall, system-level control, and separate circuit portions dedicated to performing various specific computations, functions and other processes under the control of the central processor unit. Digital logic 104 and digital logic 154 may each be implemented as a single microprocessor circuit, a digital signal processor (DSP), or a plurality of separate dedicated or programmable integrated or other electronic circuits or devices, e.g., hardwired electronic or logic circuits such as discrete element circuits or programmable logic devices. Storage 132 may be implemented using any appropriate combination of alterable, volatile or non-volatile memory or non-alterable, or fixed memory. The alterable memory, whether volatile or non-volatile, may be implemented using any one or more of static or dynamic RAM, flash memory or other alterable memory components known in the art. Similarly, the non-alterable or fixed memory may be implemented using any one or more of ROM, PROM, EPROM, EEPROM, or other non-alterable memory known in the art. Node 102 and node 152 may each also include other circuitry or components, such as memory devices, relays, mechanical linkages, communications devices, drivers and other ancillary functionality to affect desired control and/or input/output functions.

Digital logic 104 receives digital data from the transmission medium via antenna 118, terminal 116, analog receiver 112, and analog-to-digital converter 108 and provides digital data to the transmission medium via digital-to-analog converter 106, analog transmitter 110, terminal 116, and antenna 118. Similarly, digital logic 154 receives digital data from the transmission medium via antenna 168, terminal 166, analog receiver 162, and analog-to-digital converter 158 and provides digital data to the transmission medium via digital-to-analog converter 156, transmitter 160, terminal 166, and antenna 168. Switches 122 and 120 are included to selectively configure node 102 in various calibration modes. Switches 122 and 120 may include one or more devices configured to selectively provide a conductive path or a high impedance (e.g., an electrical open) in response to a control signal. The control signal may be active high or active low, and is provided by digital logic 104. Switches 170 and 172 of node 152 provide similar functionality to that of switches 120 and 122, respectively.

A technique for measuring time-of-flight, which may be used to determine ranging applications or in other suitable applications, accounts for analog transceiver latencies using various communications. For example, roundtrip latency $t_{roundtrip}$ of a roundtrip loopback communication includes the analog front end transmitter and receiver latencies for a communication from node 102 to a node 152 and back to node 102:

$$t_{roundtrip} = t_{tx1} + t_{TOF} + t_{rx2} + t_{tx2} + t_{TOF} + t_{rx1} = t_{txrx1} + (2 \times t_{TOF}) + t_{txrx2},$$

where $t_{tx1}$ is the latency of analog transmitter 110, $t_{rx1}$ is the latency of analog receiver 112, $t_{tx2}$ is the latency of analog transmitter 160, $t_{rx2}$ is the latency of analog receiver 162, $t_{txrx1}$ is the latency of analog front end 130, and $t_{txrx2}$ is the latency of analog front end 180. Based on the roundtrip latency $t_{roundtrip}$ of a roundtrip loopback communication, the channel latency or time-of-flight $t_{TOF}$ may be determined:

$$t_{TOF} = \frac{t_{roundtrip} - t_{txrx1} - t_{txrx2}}{2}.$$

Figure 2:
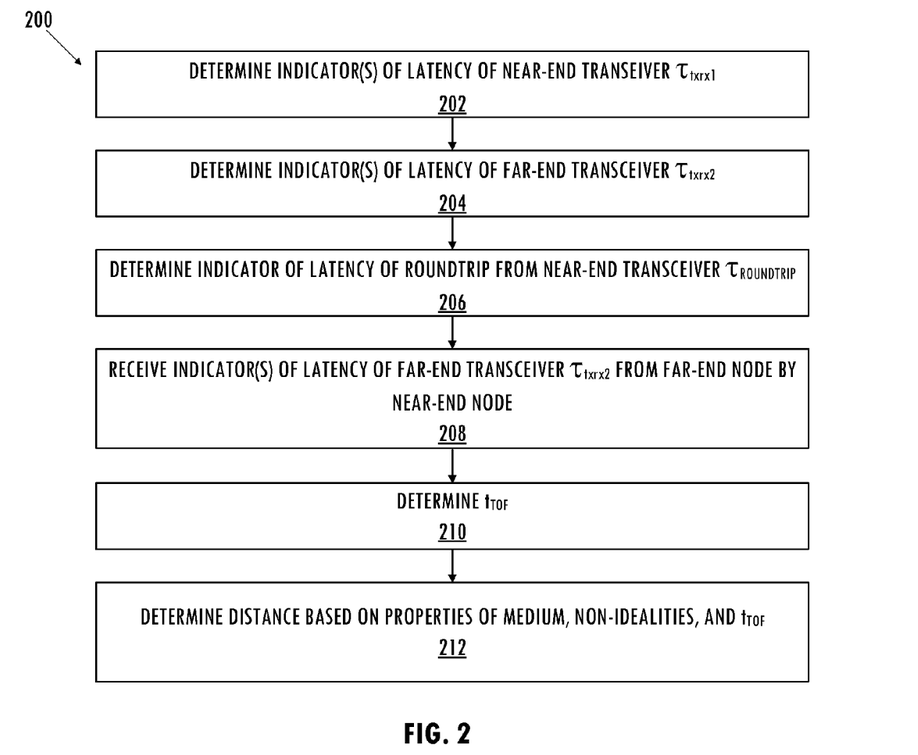
FIG. 2 is a flowchart that depicts an exemplary functional sequence for performing a transceiver calibration technique for the sensor system of FIG. 1, consistent with at least one embodiment of the invention.
Figure 3:
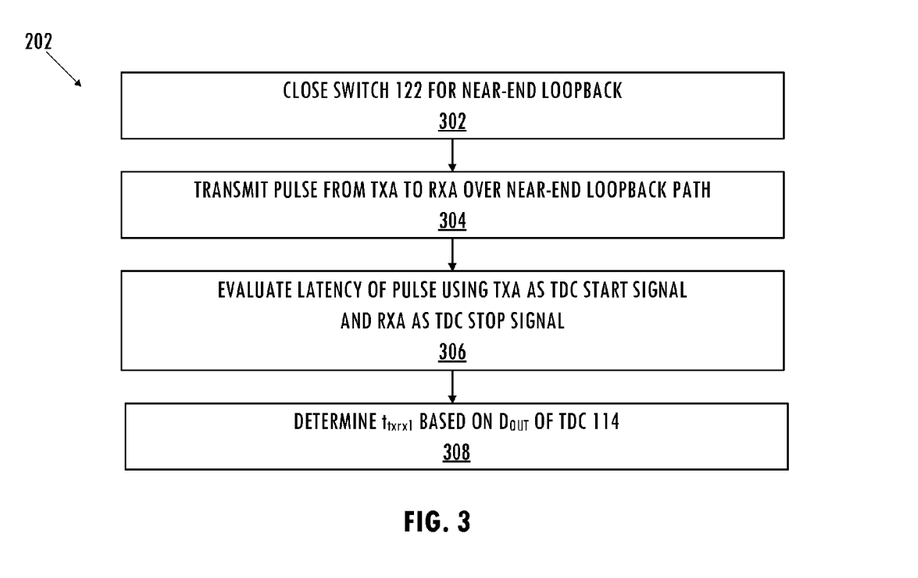
FIG. 3 is a flowchart that depicts an exemplary functional sequence for performing a portion of the transceiver calibration technique for the sensor system of FIG. 2, consistent with at least one embodiment of the invention.

Referring to FIGS. 1-7, in the following description, analog front end 130 is referred to as the near-end transceiver and analog front end 180 is referred to as the far-end transceiver, although in other embodiments analog front end 180 may be configured as the near-end transceiver and analog front end 130 as the far-end transceiver. Referring to FIGS. 1, 2, and 3, the calibration technique includes determining an indicator of near-end transceiver latency $\tau_{txrx1}$ (202). Various configurations of node 102 may be used to determine near-end transceiver latency $\tau_{txrx1}$.

For example, digital logic 104 generates control signals that cause switch 122 to be closed, switch 120 (if present) to remain open, and attenuator 128 to apply a zero-delay loopback attenuation for a near-end loopback mode (302). In at least one embodiment, node 102 is always configured as a near-end node and switch 120 is not included. Digital logic 104 configures digital-to-analog converter 106 to drive a pulse (or other suitable signal) on node TXA, at the input of analog transmitter 110. The pulse triggers time-to-digital converter 114 to start a time-to-digital conversion. Analog transmitter 110 drives a signal on node TXOUTA, which is selectively coupled to attenuator 128. Attenuator 128 applies a zero delay attenuation to adjust the amplitude of the signal within a dynamic range specification of analog receiver 112. Analog receiver 112 may amplify, filter, and/or perform other analog signal operations on the pulse signal received from node RXINA, and provides an output analog signal to node RXA (304). The pulse signal on node RXA triggers a stop to the time-to-digital conversion of time-to-digital converter 114. Time-to-digital converter 114 provides a resulting digital output code $D_{OUT}$ to digital logic 104, which may store digital output code $D_{OUT}$ as an indicator of the near-end transceiver latency $\tau_{txrx1}$ (306). In at least one embodiment, digital logic 104 determines and stores near-end transceiver latency $t_{txrx1}$ generated based on a reference clock signal period $T_{ref1}$ used by time-to-digital converter 114 (308): $t_{txrx1} = T_{ref1} \times \tau_{txrx1}$.

Figure 4:
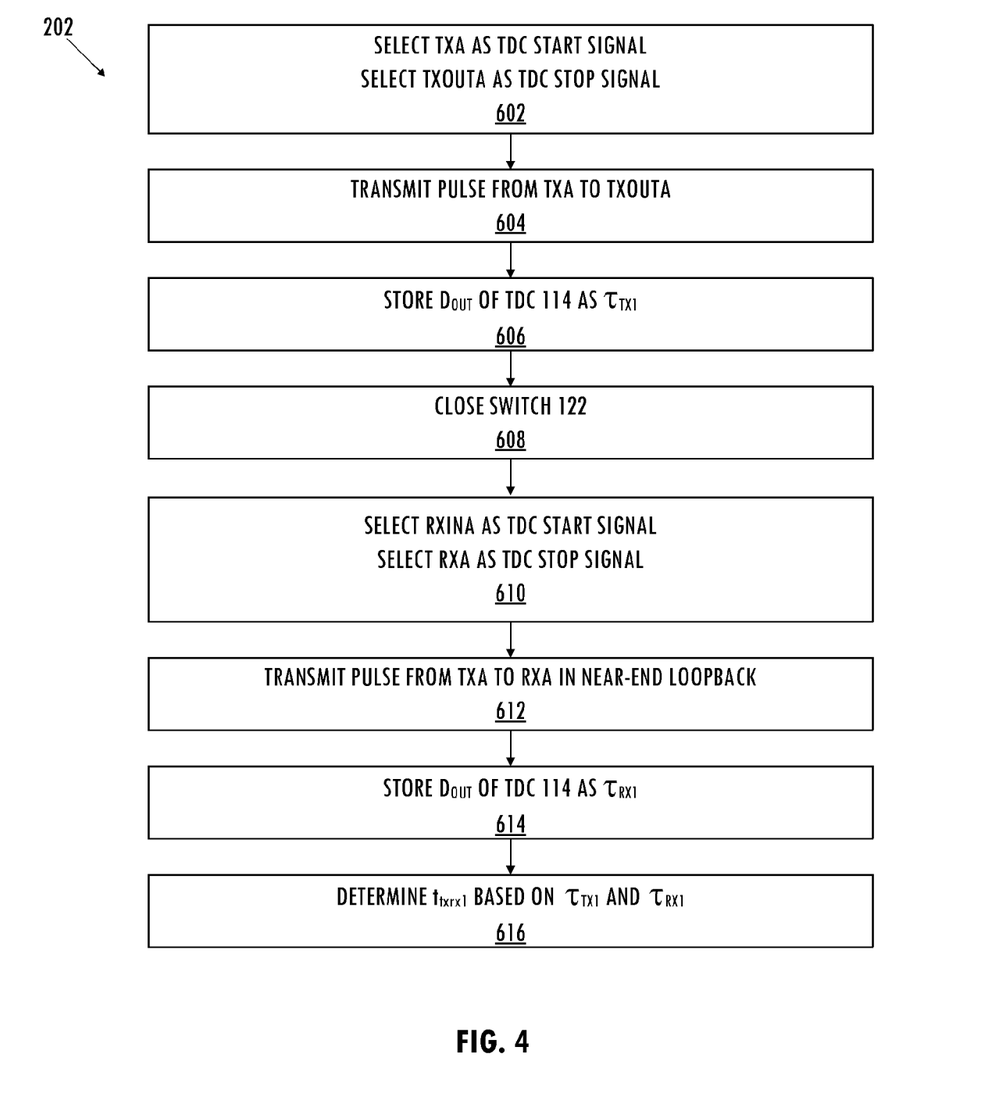
FIG. 4 is a flowchart that depicts an exemplary functional sequence for performing a portion of the transceiver calibration technique for the sensor system of FIG. 2, consistent with at least one embodiment of the invention.

Referring to FIGS. 1, 2, and 4, in at least one embodiment, node 102 determines indicators of near-end transceiver latency $\tau_{txrx1}$ of analog front end 130 (202) using another configuration of node 102. Digital logic 104 generates control signals that cause switch 122 to be open and switch 120 (if present) to be open. Digital logic 104 configures, e.g., using select circuit 126, TXA and TXOUTA as start and stop signals, respectively, for the time-to-digital conversion. In other embodiments, rather than use select circuit 126 to select start and stop signals, select circuit 126 is excluded and time-to-digital converter 114 includes multiple time-to-digital converter circuits coupled to different nodes to receive different start and stop signals. In such embodiments, digital logic 104 selects a particular time-to-digital converter circuit coupled to TXA and TXOUTA of multiple time-to-digital converter circuits of time-to-digital converter 114. Time-to-digital converter 114 determines a latency between the TXA and TXOUTA in response to a pulse on TXA and TXOUTA triggering start and stop, respectively, of an interval being evaluated by time-to-digital converter 114 (602). Digital logic 104 configures digital-to-analog converter 106 to drive a pulse on node TXA, at the input of analog transmitter 110. The pulse triggers time-to-digital converter 114 to start a time-to-digital conversion. Analog transmitter 110 drives a signal on node TXOUTA, and the pulse on node TXOUTA triggers time-to-digital converter 114 to stop the time-to-digital conversion (604). Time-to-digital converter 114 provides the resulting digital output code $D_{OUT}$ to digital logic 104, which stores digital output code $D_{OUT}$ as the indicator of the near-end transmitter latency $\tau_{tx1}$ (606). Digital logic 104 generates control signals that cause switch 122 to be closed and switch 120 (if present) to be open for a near-end loopback mode (608). Digital logic 104 configures time-to-digital converter 114 to determine a latency between node RXINA and node RXA in response to a pulse on node RXINA and node RXA triggering start and stop, respectively, of the time-to-digital converter 114 (610). Digital logic 104 configures digital-to-analog converter 106 to drive a pulse on node TXA, at the input of analog transmitter 110. Analog transmitter 110 drives the pulse signal on node TXOUTA, which is attenuated with negligible delay and provided to node RXINA. When the pulse reaches node RXINA, it triggers time-to-digital converter 114 to start a time-to-digital conversion. Analog receiver 112 drives the received pulse onto node RXA. When the pulse reaches node RXA time-to-digital converter 114 stops the time-to-digital conversion (612). Time-to-digital converter 114 provides the resulting digital output code $D_{OUT}$ to digital logic 104, which stores digital output code $D_{OUT}$ as the indicator of the near-end receiver latency $\tau_{rx1}$ (614). In at least one embodiment, digital logic 104 determines and stores near-end transceiver latency $t_{txrx1}$ based on a reference clock signal period $T_{ref1}$ used by time-to-digital converter 114 (616):

$$t_{txrx1} = T_{ref1} \times (\tau_{tx1} + \tau_{rx1}).$$

Figure 5:
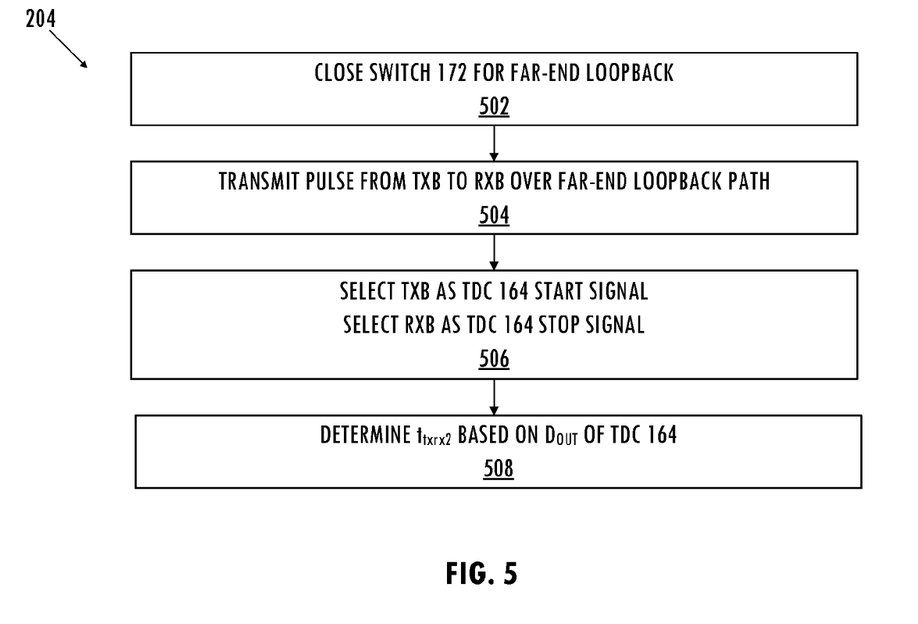
FIG. 5 is a flowchart that depicts an exemplary functional sequence for performing a portion of the transceiver calibration technique for the sensor system of FIG. 2, consistent with at least one embodiment of the invention.

Referring back to FIGS. 1, 2, and 5 the calibration technique includes determining an indicator of far-end transceiver latency $\tau_{txrx2}$ (204). Various configurations of node 152 may be used to determine far-end transceiver latency $\tau_{txrx2}$. For example, digital logic 154 generates control signals that cause switch 172 to be closed, switch 170 to be open, and attenuator 178 to apply a zero-delay loopback attenuation for the far-end loopback mode (502). Digital logic 154 configures digital-to-analog converter 156 to drive a pulse (or other suitable signal) on node TXB, at the input of analog transmitter 160. The pulse triggers time-to-digital converter 164 to start a time-to-digital conversion. Analog transmitter 160 drives a signal on node TXOUTB, which is selectively coupled to attenuator 178 (504). Attenuator 178 applies a negligible delay attenuation to adjust pulse signal within a dynamic range specification of analog receiver 162. Analog receiver 162 may amplify, filter, and/or perform other analog signal operations on the pulse signal received from node RXINB, and provides an output signal on node RXB. The pulse signal on node RXB triggers a stop of the time-to-digital conversion by time-to-digital converter 164, which provides the resulting digital output code $D_{OUT}$ to digital logic 154. Digital logic 154 stores digital output code $D_{OUT}$ as the indicator of the far-end transceiver latency $\tau_{txrx2}$ (506). In at least one embodiment, digital logic 154 determines and stores far-end transceiver latency $t_{txrx2}$ based on a reference clock signal period $T_{ref2}$ used by time-to-digital converter 164 (508):

$$t_{txrx2} = T_{ref2} \times \tau_{txrx2}.$$

Figure 6:
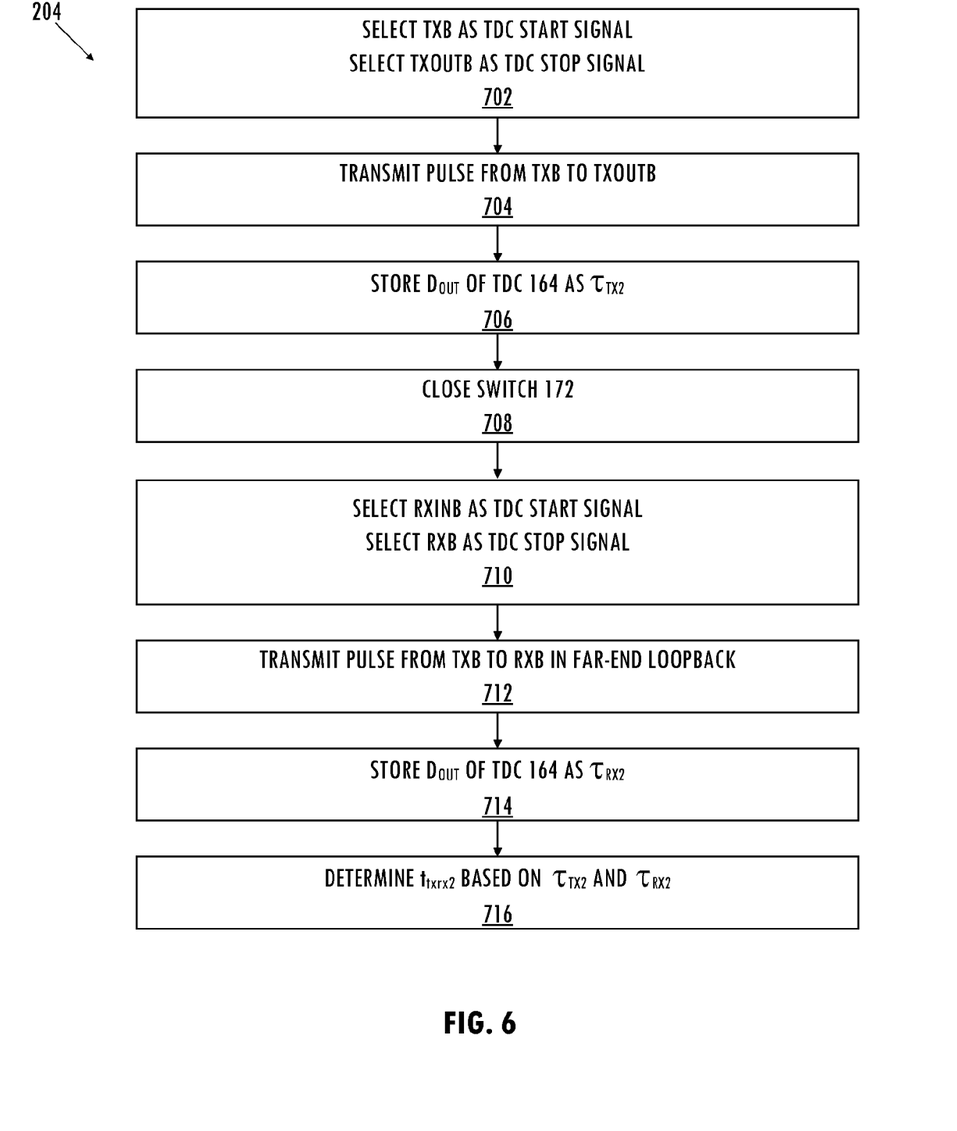
FIG. 6 is a flowchart that depicts an exemplary functional sequence for performing a portion of the transceiver calibration technique for the sensor system of FIG. 2, consistent with at least one embodiment of the invention.

Referring to FIGS. 1, 2, and 6, in at least one embodiment, node 152 determines indicators of far-end transceiver latency $\tau_{txrx2}$ of analog front end 180 (204) using another configuration of node 152. Digital logic 154 generates control signals that cause switch 172 to be open and switch 170 to be open. Digital logic 154 configures, e.g., using select circuit, node TXB and node TXOUTB as start and stop signals. In other embodiments, digital logic 154 selects a particular time-to-digital converter circuit of multiple time-to-digital converter circuits coupled to node TXB and node TXOUTB. Time-to-digital converter 164 determines a latency between node TXB and node TXOUTB in response to a pulse on node TXB and node TXOUTB triggering start and stop, respectively, of time-to-digital converter 164 (702). Digital logic 154 configures digital-to-analog converter 156 to drive a pulse on node TXB, at the input of analog transmitter 160. The pulse triggers time-to-digital converter 164 to start a time-to-digital conversion. Analog transmitter 160 drives a signal on node TXOUTB, and the pulse on node TXOUTB triggers time-to-digital converter 164 to stop the time-to-digital conversion (704). Time-to-digital converter 164 provides the resulting digital output code $D_{OUT}$ to digital logic 154, which stores digital output code $D_{OUT}$ as the indicator of far-end transmitter latency $\tau_{tx2}$ (706).

Digital logic 154 generates control signals that cause switch 172 to be closed and switch 170 to be open for a far-end loopback mode (708). Digital logic 154 configures time-to-digital converter 164 circuit to determine a latency between node RXINB and node RXB in response to a pulse on node RXINB and node RXB triggering start and stop, respectively, for time-to-digital converter 164 (710). Digital logic 154 configures digital-to-analog converter 156 to drive a pulse on node TXB, at the input of analog transmitter 160. Analog transmitter 160 drives the pulse signal on node TXOUTB. When the pulse reaches node RXINB, it triggers time-to-digital converter 164 to start the time-to-digital conversion. Analog receiver 162 drives the received pulse onto RXB. When the pulse reaches node RXB, it triggers time-to-digital converter 164 to stop the time-to-digital conversion (712). Time-to-digital converter 164 provides the resulting digital output code $D_{OUT}$ to digital logic 154, which stores digital output code $D_{OUT}$ as the indicator of the far-end transmitter latency $\tau_{rx2}$ (714). In at least one embodiment, digital logic 154 determines and stores far-end transceiver latency $t_{txrx2}$ based on a reference clock signal period $T_{ref2}$ used by time-to-digital converter 164 (716):

$$t_{txrx2} = T_{ref2} \times (\tau_{tx2} + \tau_{rx2}).$$

Figure 7:
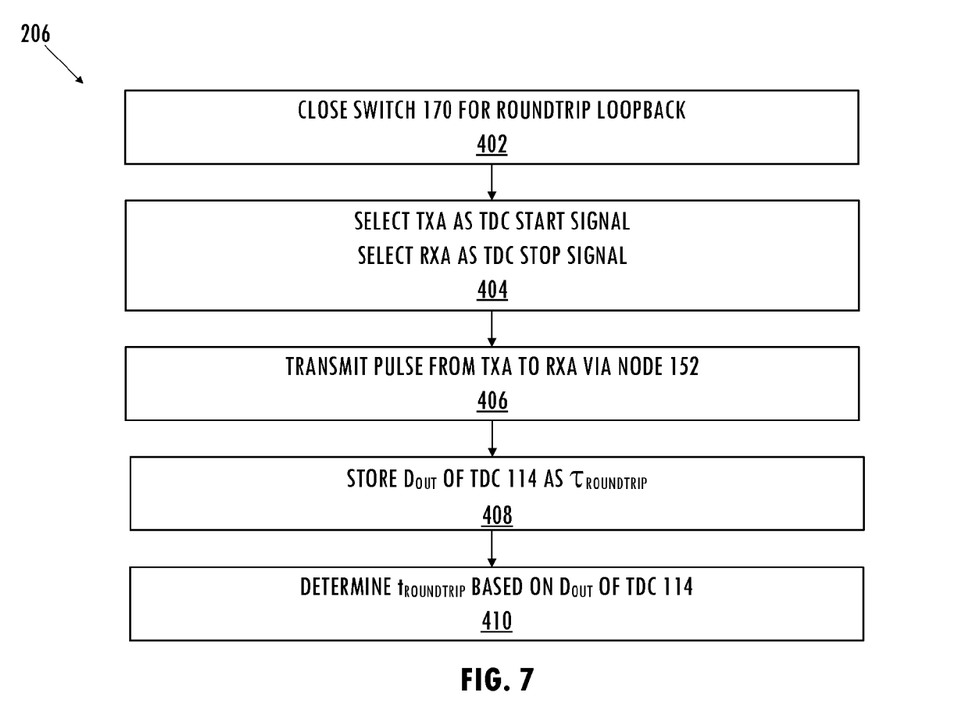
FIG. 7 is a flowchart that depicts an exemplary functional sequence for performing a portion of the transceiver calibration technique for the sensor system of FIG. 2, consistent with at least one embodiment of the invention.

Referring to FIGS. 1, 2, and 7, node 102 determines an indicator of roundtrip latency $\tau_{ROUNDTRIP}$ of a communication that travels roundtrip from the near-end transceiver to the far-end transceiver, and back to the near-end transceiver (206). Digital logic 102 generates control signals that cause switch 120 (if present) to be open. Digital logic 154 generates control signals that cause switch 170 to be closed (402). Digital logic 104 configures (e.g., using select circuit 126) time-to-digital converter 114 to use TXA and RXA as start and stop signals (404). Digital logic 104 configures digital-to-analog converter 106 to drive a pulse on node TXA, at the input of analog transmitter 110. In nodes that use only one terminal for transmit and receive paths, digital logic 102 and digital logic 154 control switches 122 and 172, respectively, according to transmit and receive operations of the corresponding node. The pulse triggers time-to-digital converter 114 start time-to-digital conversion. Analog transmitter 110 drives a signal on node TXOUTA, and the signal is transmitted by terminal 116 and antenna 118 to node 152. Antenna 168 and terminal 166 receive the signal and provide the signal to analog receiver 162. The signal loops back from node RXB to node TXB and analog transmitter 160 drives the signal out using terminal 166 and antenna 168. Antenna 118 and terminal 116 receive the signal, which is then provided to node RXA via analog receiver 112 (406). Time-to-digital converter 114 stops the time-to-digital conversion. Time-to-digital converter 114 provides the resulting digital output code $D_{OUT}$ to digital logic 104, which stores digital output code $D_{OUT}$ as the indicator of the roundtrip transceiver latency $\tau_{ROUNDTRIP}$ (408). In at least one embodiment, digital logic 104 determines and stores roundtrip transceiver latency $t_{ROUNDTRIP}$ based on a reference clock signal period $T_{ref1}$ used by time-to-digital converter 114 (410):

$$t_{ROUNDTRIP} = T_{ref1} \times \tau_{ROUNDTRIP}.$$

Referring back to FIGS. 1 and 2, after node 152 determines far-end transceiver latency $t_{txrx2}$ or one or more indicators of far-end transceiver latency $\tau_{txrx2}$ (204), node 152 transmits far-end transceiver latency $t_{txrx2}$ or the one or more indicators of far-end transceiver latency $\tau_{txrx2}$, as the case may be, to node 102. Node 102 receives the near-end transceiver latency $t_{txrx2}$ or the one or more indicators of near-end transceiver latency $\tau_{txrx2}$ (208) and may store the information in one or more corresponding locations of storage 132. Node 102 uses the latency information associated with node 102 and node 152 to determine a channel latency or time-of-flight $t_{TOF}$ (210):

$$t_{TOF} = \frac{t_{roundtrip} - t_{txrx1} - t_{txrx2}}{2}.$$

The channel latency or time-of-flight estimate may be used to calculate the distance between node 102 and node 152. That calculation may account for properties of the medium, non-idealities, or other relevant information (212):

$$\text{DISTANCE} = c' \times t_{TOF},$$

where c' is the speed of light through the medium through which the signal travels, and $$c' = \frac{c}{\sqrt{\mu_r \varepsilon_r(\omega)}},$$

where $\mu_r$ is the relative permeability of the medium through which the signal travels and $\varepsilon_r(w)$ is the relative permittivity of the medium through which the signal travels:

$$\varepsilon_r(\omega) = \frac{\varepsilon(\omega)}{\varepsilon_0}, \text{ and } \mu_r = \frac{\mu}{\mu_0},$$

where $\varepsilon(w)$ is the complex frequency-dependent absolute permittivity of the material (e.g., air, water, polyethylene (coaxial cable), dielectric materials used in RF transmission lines and optical fibers), $\varepsilon_0$ is the vacuum permittivity, $\mu$ is the permeability of the material, and $\mu_0$ is the vacuum permeability. Assuming $\mu_r = 1$, $$\text{DISTANCE} = \frac{c}{\sqrt{\varepsilon_r(\omega)}} \times t_{TOF}.$$

Propagation of radio frequency signals in a vacuum is approximately $3 \times 10^8$ m/s. In typical atmospheric conditions, the refractive index of air is approximately 299,700 km/s or 90 km/s slower than c (c is 2.99792458 m/s), approximately 300 parts per million (ppm) difference in typical atmospheric conditions. Information detected by sensor 124 and sensor 174 may be used by digital logic 104 and digital logic 154 to adjust the effective value of $\varepsilon_r(\omega)$. Node 152 may transmit that information with $\tau_{txrx2}$ or at other suitable times.

Note that other sequences of determinations 202, 204, 206, and 208 that do not change the data dependencies of determination may be used. In at least one embodiment, node 152 also sends a digital time reference value (e.g., $T_{ref2}$) that corresponds to the period of a reference clock signal used by time-to-digital converter 164. In at least one embodiment, rather than node 152 sending an indicator of the far-end transceiver latency $\tau_{txrx2}$, node 152 converts the digital output of time-to-digital converter 164 to a time value of the far-end transceiver latency $t_{txrx2}$, e.g., by multiplying far-end transceiver latency $\tau_{txrx2}$ by the period of a reference clock signal used by time-to-digital converter 164. Node 102 may store the latency values in storage 132 as intermediate results and digital logic 104 may determine time-of-flight $t_{TOF}$ based thereon (210). For example, the latency indicators may be converted into latency time values by adjusting for the period of a corresponding reference clock signal of time-to-digital converter 114 and time-to-digital converter 164, if not already adjusted before storing as intermediate values:

$$t_{txrx1} = T_{ref1} \times \tau_{txrx1},$$

$$t_{txrx2} = T_{ref2} \times \tau_{txrx2}, \text{ and}$$

$$t_{roundtrip} = T_{ref1} \times \tau_{roundtrip},$$

where $T_{ref1}$ is the period of a reference clock signal used by time-to-digital converter 114 and $T_{ref2}$ is the period of a reference clock signal used by time-to-digital converter 164. Digital logic 104 then determines time-of-flight (210):

$$t_{TOF} = \frac{t_{roundtrip} - t_{txrx1} - t_{txrx2}}{2}.$$

If $T_{ref1}$ and $T_{ref2}$ are equal, then time-of-flight may be determined at node 102 as follows (210):

$$t_{TOF} = T_{ref1} \times \left( \frac{\tau_{roundtrip} - \tau_{txrx1} - \tau_{txrx2}}{2} \right).$$

The resulting time-of-flight estimate accounts for the latencies of a near-end transceiver and the latencies of a far-end transceiver and may be used to determine an improved estimate of distance, which may also be adjusted for properties of the transmission medium, non-idealities, etc. (212).

Referring back to FIGS. 1 and 2, transceiver calibration technique 200 may be performed at system start-up, prior to steady-state communications between node 102 and node 152. In at least one embodiment, node 102 periodically initiates transceiver calibration technique 200 to update distance measurements in response to a change in relative position of the nodes during steady-state communications. In addition, sensors 124 and 174 may be used by the measurement updates to account for changes to environmental conditions.

Thus, improved techniques for determining time-of-flight of a signal between two nodes have been disclosed. While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which nodes transmit pulse signals for evaluating latency, one of skill in the art will appreciate that the teachings herein can be utilized with other signal types that may be used to trigger evaluation of a time interval by a time-to-digital converter. Although the invention has been described in an embodiment in which nodes communicate over an air interface, one of skill in the art will appreciate that the teachings herein can be utilized with other communications media (e.g., water, transmission line, etc.). Variations and modifications of the embodiments disclosed herein, may be made based on the description set forth herein, without departing from the scope and spirit of the invention as set forth in the following claims.

What is claimed is:

1. A method comprising:
   determining a first indicator of a first latency of a first transceiver of a first system using a first loopback configuration of the first transceiver;
   receiving a second indicator of a second latency of a second transceiver determined by a second system using a second loopback configuration of the second transceiver;
   determining a third indicator of a roundtrip latency of a communication from the first transceiver to the second transceiver and back to the first transceiver; and
   determining a time-of-flight between the first system and the second system based on the first indicator, the second indicator, and the third indicator.

2. The method, as recited in claim 1, further comprising:
   determining a distance between the first system and the second system based on the time-of-flight and a property of a physical transmission medium between the first system and the second system.

3. The method, as recited in claim 2, further comprising:
   sensing an indication of a sensed variable affecting the property, the distance being determined further based on the sensed variable.

4. The method, as recited in claim 1, further comprising:
   configuring the second transceiver in the second loopback configuration;
   determining the second indicator by the second system; and
   transmitting the second indicator from the second system to the first system.

5. The method, as recited in claim 1, further comprising:
   configuring the second transceiver in a third loopback configuration, wherein determining the roundtrip latency of the communication uses the third loopback configuration.

6. The method, as recited in claim 1, wherein determining the first indicator comprises:
   configuring the first system to have the first loopback configuration;
   triggering a start of a time-to-digital conversion in response to a first signal edge on a first node between a digital-to-analog signal converter of the first system and an input to the first transceiver; and
   triggering a stop of the time-to-digital conversion in response to a second signal edge on a second node between an analog-to-digital signal converter of the first system and an output of the first transceiver.

7. The method, as recited in claim 1, wherein determining the first indicator comprises:
   attenuating a signal on a first node between a transmitter output of the first transceiver and a port of the first system to generate an attenuated signal; and
   providing the attenuated signal to a receiver input of the first transceiver.

8. The method, as recited in claim 1, further comprising:
   determining the second indicator comprising:
      transmitting a pulse using a transmitter of the second transceiver;
      triggering a start of a time-to-digital conversion in response to the pulse on a first node between a digital-to-analog signal converter of the second system and a transmitter input of the second transceiver;
      receiving a version of the pulse by a receiver of the second transceiver; and
      triggering a stop of the time-to-digital conversion in response to the version of the pulse on a second node between an analog-to-digital signal converter of the second system and a receiver output of the second transceiver.

9. The method, as recited in claim 1, wherein determining the third indicator comprises:
   configuring the second system to have a third loopback configuration;
   transmitting a pulse using a transmitter of the first transceiver;
   triggering a start of a time-to-digital conversion in response to the pulse on a first node between a digital-to-analog signal converter of the first system and a transmitter input of the first transceiver;
   receiving a version of the pulse by a receiver of the first transceiver; and
   triggering a stop of the time-to-digital conversion in response to the version of the pulse between an analog-to-digital signal converter of the first system and a receiver output of the first transceiver.

10. An apparatus comprising:
    a first system comprising a transceiver, the transceiver including a transmitter and a receiver, an output of the transmitter being selectively coupled to an input of the receiver in a first configuration of the first system;
    a time-to-digital converter module configured to generate a first indicator of a first latency in the first configuration of the first system; and
    a digital module configured to determine a time-of-flight between the first system and a second system based on the first indicator, a second indicator of a second latency of a second transceiver of a second system, and a third indicator of a roundtrip latency.

11. The apparatus, as recited in claim 10, wherein the transceiver is configured to receive the second indicator from the second system.

12. The apparatus, as recited in claim 10, wherein the transceiver is configured to transmit the first indicator to the second system.

13. The apparatus, as recited in claim 10, wherein the time-to-digital converter module is configured to generate the third indicator of the roundtrip latency in a second configuration of the first system.

14. The apparatus, as recited in claim 10, wherein the digital module determines a distance between the first system and the second system based on the time-of-flight and a property of a physical transmission medium between the first system and the second system.

15. The apparatus, as recited in claim 14, further comprising:
    a sensor configured to provide an indication of a sensed variable affecting the property, the distance being determined further based on the sensed variable.

16. The apparatus, as recited in claim 10, further comprising:
> a switch circuit configured to selectively couple the output of the transmitter to the input of the receiver in the first configuration of the first system.

17. The apparatus, as recited in claim 10, further comprising:
> a switch circuit configured to selectively couple the output of the receiver to the input of the transmitter in a second configuration of the first system.

18. The apparatus, as recited in claim 10, further comprising:
> an analog-to-digital converter coupled between an output of the receiver and the digital module; and
> a digital-to-analog converter coupled between an input of the transmitter and the digital module.

19. The apparatus, as recited in claim 10, further comprising:
> a zero-delay attenuator configured to receive a signal from the transmitter and provide an attenuated version of the signal to the receiver in the first configuration and configured to be disabled in a second configuration.

20. A method comprising:
configuring a first transceiver of a first system in a first loopback configuration;
determining a first indicator of a first latency of the first transceiver using the first loopback configuration, determining the first indicator comprising:
> triggering a start of a time-to-digital conversion in response to a first signal edge on a first node between a transmit path digital-to-analog signal converter of the first system and an input to a transmitter the first transceiver;
> triggering a stop of the time-to-digital conversion in response to a second signal edge on a second node between a receiver path analog-to-digital signal converter of the first system and an output of a receiver of the first transceiver; and transmitting the first indicator from the first system to a second system.

* * * * *

UNITED STATES PATENT AND TRADEMARK OFFICE
CERTIFICATE OF CORRECTION

PATENT NO. : 9,634,861 B2
APPLICATION NO. : 14/798545
DATED : April 25, 2017
INVENTOR(S) : Aaron J. Caffee Page 1 of 1

It is certified that error appears in the above-identified patent and that said Letters Patent is hereby corrected as shown below:

In Column 14, Line 12, Claim 20 please insert --of-- after "transmitter".

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*